United States Patent
Koh

(10) Patent No.: US 9,964,937 B2
(45) Date of Patent: *May 8, 2018

(54) REDUNDANT WATCHDOG METHOD AND SYSTEM UTILIZING SAFETY PARTNER CONTROLLER

(71) Applicant: Rockwell Automation Asia Pacific Business Ctr. Pte., Ltd., Singapore (SG)

(72) Inventor: Kian Kiat Koh, Singapore (SG)

(73) Assignee: Rockwell Automation Asia Pacific Business Ctr. Pte. Ltd., Singapore (SG)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/488,893

(22) Filed: Apr. 17, 2017

(65) Prior Publication Data

US 2017/0220015 A1 Aug. 3, 2017

Related U.S. Application Data

(63) Continuation of application No. 14/604,046, filed on Jan. 23, 2015, now Pat. No. 9,632,492.

(51) Int. Cl.
*G06F 11/00* (2006.01)
*G05B 19/042* (2006.01)
*G06F 11/07* (2006.01)

(52) U.S. Cl.
CPC ..... *G05B 19/0425* (2013.01); *G05B 19/0428* (2013.01); *G06F 11/0736* (2013.01);
(Continued)

(58) Field of Classification Search
CPC ............. G06F 11/1604; G06F 11/0757; G06F 11/1608; G06F 11/1654; G06F 11/1679; G06F 11/1695
See application file for complete search history.

(56) References Cited

U.S. PATENT DOCUMENTS 4,472,789 A 9/1984 Sibley
5,479,420 A * 12/1995 Hong ........................ G06F 1/04
714/814

(Continued)

FOREIGN PATENT DOCUMENTS

EP 0 575 854 A2 12/1993
EP 1 916 581 A2 4/2008
(Continued)

OTHER PUBLICATIONS

European Search Report completed Jun. 3, 2016 for Application No. EP 16 15 2331.

*Primary Examiner* — Charles Ehne
(74) *Attorney, Agent, or Firm* — Fay Sharpe LLP

(57) ABSTRACT

This disclosure provides an automation controller method, system and apparatus including a redundant watchdog utilizing a safety partner controller. According to an exemplary controller, the controller includes a first processing unit, a second processing unit, and an integrated circuit configured to receive as inputs fault indicator signals from the first and second processing units, and the integrated circuit configured to disable I/O communications for a fault condition detected by the first or second processing units.

17 Claims, 4 Drawing Sheets

(52) U.S. Cl.
CPC ...... *G06F 11/0757* (2013.01); *G06F 11/0772* (2013.01); *G05B 2219/1105* (2013.01); *G05B 2219/14006* (2013.01); *G05B 2219/14012* (2013.01)

(56) References Cited

U.S. PATENT DOCUMENTS

| | | | |
|---|---|---|---|
| 5,948,111 | A | 9/1999 | Taylor et al. |
| 6,247,160 | B1 | 6/2001 | Davidsson et al. |
| 6,253,348 | B1 | 6/2001 | Davidsson et al. |
| 6,298,393 | B1 | 10/2001 | Hopsecger |
| 6,909,923 | B2 * | 6/2005 | Vasko ............ G05B 9/03 700/21 |
| 7,089,462 | B2 | 8/2006 | Floyd et al. |
| 7,617,412 | B2 | 11/2009 | Shelvik et al. |
| 8,423,823 | B2 | 4/2013 | Venus |
| 2004/0153886 | A1 | 8/2004 | Schumacher et al. |
| 2005/0060605 | A1 | 3/2005 | Gibart et al. |
| 2005/0060606 | A1 * | 3/2005 | Kalan ............ G05B 9/03 714/12 |
| 2005/0081117 | A1 * | 4/2005 | Gibart ............ H04L 43/0858 714/47.2 |
| 2005/0091410 | A1 | 4/2005 | Gibart et al. |
| 2006/0225911 | A1 | 10/2006 | Swenson et al. |
| 2006/0230323 | A1 | 10/2006 | Siegwart |
| 2010/0131801 | A1 | 5/2010 | Baleani |
| 2010/0169752 | A1 | 7/2010 | Kuenemund |
| 2012/0243559 | A1 | 9/2012 | Pan |

FOREIGN PATENT DOCUMENTS

| | | |
|---|---|---|
| EP | 2 490 124 A2 | 8/2012 |
| EP | 2 511 778 A2 | 10/2012 |
| WO | WO 00/76146 A1 | 12/2000 |

\* cited by examiner

REDUNDANT WATCHDOG METHOD AND SYSTEM UTILIZING SAFETY PARTNER CONTROLLER

CROSS REFERENCE TO RELATED APPLICATION

This application is a continuation of U.S. Ser. No. 14/604,046, filed Jan. 23, 2015, entitled "REDUNDANT WATCHDOG METHOD AND SYSTEM UTILIZING SAFETY PARTNER CONTROLLER" and the entire disclosure of said prior application is hereby incorporated by reference into the present specification.

BACKGROUND INFORMATION

The subject matter disclosed herein relates to industrial "safety controllers" used for real-time control of industrial processes and appropriate for use in devices and systems intended to protect human life and health, and in particular to "safety I/O modules," a component of a safety system.

"Safety controllers" are special purpose computers used to ensure the safety of humans working in the environment of an industrial process. Under the direction of a stored safety control program, a safety controller examines a series of inputs reflecting the status of the controlled process and changes a series of outputs controlling the industrial process. The inputs and outputs may be binary, i.e., on or off, or analog, i.e., providing a value within a continuous range. The inputs may be obtained from light curtains or other sensors attached to industrial process equipment and the outputs may be signals to power control relays, actuators or motors on the equipment.

"Safety I/O modules" are a form of distributed inputs and outputs ("I/O") and are connected to and monitored by safety controllers. One benefit of using remote I/O includes the ability to place I/O where the devices reside. This greatly improves the ability to maintain and troubleshoot the I/O and devices. Further, installation time and wiring costs are greatly reduced. Safety I/O modules in particular provide additional benefits such as the ability to monitor the I/O safety reaction time, discussed in greater detail below also known as the CIP (Common Industrial Protocol) safety protocol extensions. If a safety I/O module is processing an input or output, it provides a safety reaction time which must meet industry requirements.

"Safety systems" are systems that incorporate safety controllers along with the electronics associated with emergency-stop buttons, interlock switches, light curtains and other machine lockouts to provide a safer working environment.

A critical component that factors into the design of a safety system is the "safety reaction time." The safety reaction time, also known as the "safety response time," is defined as the amount of time from a safety-related event as input to the safety system until the system is in the safe state. In other words, it is the time from electrical recognition of a safety demand such as an e-stop button depressed or light curtain traversed, until all the system's actuators operation to a safe state. The safe state is different for each system and can range from a stopped motor, a closed valve or a de-energized electrical component.

In designing safety systems, it is desirable to have a fast safety reaction time to permit the placement of safety components such as light curtains as close to machinery as possible. The safety reaction time of a safety system directly affects how close a component, e.g., a light curtain, can be placed to a piece of machinery, e.g., a press. In a properly designed safety system, the time it takes for an operator's hand to pass through a light curtain and come into contact with an unsafe machine component is greater than the time required for the safety controller to receive the light curtain input signal, process it and direct the machinery into a safe mode. Therefore, the faster the safety reaction time, the closer light curtains and similar safety devices can be mounted to the machinery. This is particularly beneficial when installation space is limited or if the machine operation includes frequent operator interventions such as inserting and removing workpieces.

The safety reaction time of an industrial system depends on the rate of data transmission between the components as well as the processing time of the safety controller. The safety reaction time is the sum of: the sensor reaction time, input reaction time, safety task reaction time, output reaction time and actuator reaction time. Each of these times is variably dependent on factors such as the type of I/O module and logic instructions within a specific safety program. The safety task reaction time of a controller is the worst-case delay from any input change presented to the controller until the processed output is set by the output producer. Each safety device implements a safety watchdog timer to limit the safety task reaction time to a maximum permissible time. If the safety task reaction time exceeds the safety watchdog timer, the safety device will fault and the outputs will automatically transition to a safe state.

In conjunction with the importance of having a fast safety reaction time, it is equally, if not more so, important that a safety system have a repeatable and reliable safety reaction time. Repeatability and reliability are critical because the various guard components of a safety system are installed at distances calculated using the safety reaction time. It would be unacceptable to place a light curtain at a certain calculated "safe" distance from a machine, only to have the safety reaction time drift higher after the installation. If that were to happen, it would be possible that an operator could come into contact with harmful machinery before it had fully entered its safe state.

To this extent, industry standards exist to ensure the proper operation, and therefore an accurate safety reaction time, of a safety device. For example, the International Electrotechnical Commission (IEC) developed standard 61508, entitled Functional Safety of Electrical/Electronic/Programmable Electronic Safety-Related Systems. IEC 61508 specifies 4 safety integrity levels (SILs) of safety performance for a safety function. Safety systems with a SIL of 2 (SIL 2) and 3 (SIL 3) generally require redundancy for sensors, final control elements and control system processors.

SIL 3-compliant safety devices typically have dual central processing units, also known as processors or CPUs, running independent safety functions. The safety functions have some shared commonality but also perform different tasks. The CPUs rely on standard watchdog timers, as are well known in the art, to verify that their clock sources are delivering a consistently steady clock pulse. Verification of the clock sources is needed to verify that the safety devices are providing the correct safety reaction times. However, watchdog timers are based on the frequency driving the CPU and therefore are only as accurate as the underlying clock source. Typically, a quartz-based oscillator is used to generate the clock pulses, i.e., the frequency, that drive a CPU, among other things. Under normal operating conditions, these oscillators are extremely reliable and durable. However, in an industrial environment, the crystals can get hot, jostled or contaminated causing them to drift and become unreliable.

If an oscillator clock source were to drift slower than the rated speed, the CPU driven by it would also run slower. For example, if a normally-rated 3.0 GHz CPU had a slightly slower clock source, it might instead run at 2.99999 GHz. If the system clock is tracking time by counting clock pulses, after $3.0 \times 10^9$ pulses, the actual elapsed time would be slightly longer than one second but the system clock would indicate that exactly one second has elapsed. Without an independent clock source to verify that $3.0 \times 10^9$ pulses took exactly one second, the CPU would have no way to know that it was operating slower or faster than normal. One potential real-life result of this could be a situation where a safety reaction time was designed and advertised to be 6.0 ms but in actuality ends up being closer to 6.1 ms. A watchdog function controlled by an independent clock source could detect the clock source speed drift and the safety system could respond accordingly. Although these numbers may appear to be minute timing differences, the SIL requirements for safety devices and safety systems are very demanding.

Therefore it is necessary that each CPU in a dual-CPU safety device have an independent clock source to verify that its own single clock source is operating within specified parameters. Traditional safety devices have multiple independent clock sources and therefore can use one of those clock sources when running a diagnostic to verify the accuracy of the primary clock source. In an attempt to make safety devices, such as safety I/O modules, smaller, each CPU may have only one clock source. However, there is no way for the device to verify the accuracy of each clock source without an external, independent clock source. This can be a problem with lesser expensive single clock source CPUs.

In a dual-CPU safety device having single clock source CPUs, one possible solution to the lack of independently verifying clock sources would be to use the clock source of the partner CPU to cross-check and verify the accuracy of the clock source of the primary CPU. However, this solution provides no way to ensure that the clock source of the partner, i.e., verifying, CPU is accurate. If the verifying CPU's clock source has drifted, it will not provide proper verification of the accuracy of the primary CPU's clock source. In other words, in the absence of a cross check, an inaccurate clock source in the partner CPU could be used to check the clock source of the primary CPU as well as verify that its own safety critical functions were completed within the rated safety reaction time.

U.S. Pat. No. 7,617,412, issued Nov. 10, 2009, by Shelvik et al., and entitled "SAFETY TIMER CROSSCHECK DIAGNOSTIC IN A DUAL-CPU SAFETY SYSTEM", discloses a dual-CPU safety device that validates the accuracy of the clock source for each CPU. Through a diagnostic, the first CPU verifies the accuracy of the clock source of a second CPU and then the second CPU verifies the clock source of the first CPU. If it is determined that either CPU has a faulty clock source, the safety device faults and the controlled process enters a safe state.

If the elapsed time is within the range, the first and second processors swap roles wherein the first processor monitors the accuracy of the clock source of the second processor. After one cycle of the second safety loop, i.e., after the safety reaction time has elapsed as calculated by the clock source of the second processor, the second processor verifies its safety critical functions have been completed. If not, the second processor faults. If they have been completed, the second processor sends a rendezvous signal to the first processor which then determines if the safety reaction time, as determined by the second processor using its clock source, is within a pre-set range. The two processors continue swapping roles while the diagnostic is running.

INCORPORATION BY REFERENCE

U.S. Pat. No. 7,617,412, issued Nov. 10, 2009, by Shelvik et al., and entitled "SAFETY TIMER CROSSCHECK DIAGNOSTIC IN A DUAL-CPU SAFETY SYSTEM";

U.S. Pat. No. 7,089,462, issued Aug. 8, 2006, by Floyd et al., and entitled "EARLY CLOCK FAULT DETECTION METHOD AND CIRCUIT FOR DETECTING CLOCK FAULTS IN A MULTIPROCESSING SYSTEM";

U.S. Pat. No. 6,909,923, issued Jun. 21, 2005, by Vasko et al., and entitled "SAFETY COMMUNICATION ON A SINGLE BACKPLANE";

U.S. Pat. No. 6,298,393, issued Oct. 2, 2001, by Hopsecger, and entitled "INDUSTRIAL CONTROL SYSTEMS HAVING INPUT/OUTPUT CIRCUITS WITH PROGRAMMABLE INPUT/OUTPUT CHARACTERISTICS;

U.S. Pat. No. 6,253,348, issued Jun. 26, 2001, by Davidsson et al., and entitled "HARDWARE DESIGN FOR MAJORITY VOTING, AND TESTING AND MAINTENANCE OF MAJORITY VOTING;

U.S. Pat. No. 6,247,160, issued Jun. 12, 2001, by Davidsson et al., and entitled "HARDWARE DESIGN FOR MAJORITY VOTING, AND TESTING AND MAINTENANCE OF MAJORITY VOTING"

U.S. Pat. No. 5,948,111, issued Sep. 7, 1999, by Taylor et al., and entitled "REAL TIME COMPARISON OF INTEGRATED CIRCUIT OPERATION";

U.S. Pat. No. 5,479,420, issued Dec. 26, 1995, by Hong et al., and entitled "CLOCK FAULT MONITORING CIRCUIT";

U.S. Pat. No. 4,472,789, issued Sep. 18, 1984, by Sibley, and entitled "VITAL TIMER";

U.S. Patent Publication No. 2006/0230323, published Oct. 12, 2006, by Siegwart, and entitled "MEASURING ELAPSED TIME FOR A SOFTWARE ROUTINE";

U.S. Patent Publication No. 2006/0225911, published Oct. 12, 2006, by Swenson et at, and entitled "ROTATABLE COVER PLATE";

U.S. Patent Publication No. 2005/0091410, published Apr. 28, 2005, by Gibart et al., and entitled "SAFETY CONTROLLER WITH SIMPLIFIED INTERFACE;

U.S. Patent Publication No. 2005/0081117, published Apr. 14, 2005, by Gibart, and entitled "SAFETY CONTROLLER WITH SAFETY RESPONSE TIME MONITORING";

U.S. Patent Publication No. 2005/0060606, published Mar. 17, 2005, by Kalan et al., and entitled "SAFETY CONTROLLER PROVIDING FOR EXECUTION OF STANDARD AND SAFETY CONTROL PROGRAMS";

U.S. Patent Publication No. 2005/0060605, published Mar. 17, 2005, by Gibart et al., and entitled "HIGH SPEED SYNCHRONIZATION IN DUAL-PROCESSOR SAFETY CONTROLLER"; and U.S. Patent Publication No. 2004/0153886, published Aug. 5, 2004, by Schumacher et al. and entitled "DEVICE FOR MONITORING A PROCESSOR", are incorporated herein by reference in their entirety.

BRIEF DESCRIPTION

In one embodiment of this disclosure, described is an industrial automation controller comprising: a first processing unit including a first processor, a first memory, a first clock source, and a first fault indicator signal, the first processing unit configured to execute a first safety loop; a second processing unit including a second processor, a second memory, a second clock source, and a second fault indicator signal, the second processing unit configured to execute a second safety loop; a communication link configured to provide data communications between the first processing unit and the second processing unit; a communications device operatively associated with I/O (Input/ Output) communications between the first processing unit and one or more remote devices; and an integrated circuit operatively associated with the first processing unit and the second processing unit, the integrated circuit configured to receive as inputs the first fault indicator signal and the second fault indicator signal, provide status information between the first processor and the communications device, and disable the I/O communications if the first fault indicator signal and/or the second fault indicator signal represents a fault condition associated with an execution of the first safety loop and/or the second safety loop.

In another embodiment of this disclosure, described is a method of operating an industrial automation controller including a first processing unit and a second processing unit, the first processing unit including a first processor, a first memory, a first clock source and a first fault indicator signal, the second processing unit including a second processor, a second memory, a second clock source and a second fault indicator signal, the first and second memory loadable with a first and second safety program, respectively, and input/output variables, the safety programs being repeatedly executable to read input variables representing inputs from one or more remote devices and write output variable representing outputs to one or more remote devices, the method comprising: a) synchronizing the first and second processors; b) loading the first and second processors with first and second predetermined interrupt times, respectively; c) executing at least one loop of both safety programs, the first processing unit generating a safety I/O message which is wrapped with a CST (Coordinate System Time) based on the first clock source and passed to the second processing unit for validation by the second processing unit; d) if the CST is not within predetermined range of values, the second processing unit generating the second fault indicator signal which is associated with disabling communications to the one or more remote devices; and e) interrupting the first processor after the first interrupt time has elapsed as perceived by the first processor.

In still another embodiment of this disclosure, described is a controller module comprising: a first processing unit having a first processor driven by a first clock source; a second processing unit having a second processor independent from the first processor driven by a second clock source independent from the first clock source wherein the second processor is synchronized with the first processor; and a diagnostic running in the first and second processing units; wherein the diagnostic validates the accuracy of each clock source, the second processing unit validates a CST time associated with a safety I/O message provided by the first processing unit, the diagnostic initially assigns the first processor to be a controlling processor and the second processor to be a monitoring processer, the monitoring processor is set to be interrupted after the controlling processor is set to be interrupted, and the second processing unit disables communications to one or more associated remote devices if the CST time is not within a predetermined range of values.

DETAILED DESCRIPTION

Figure 1:
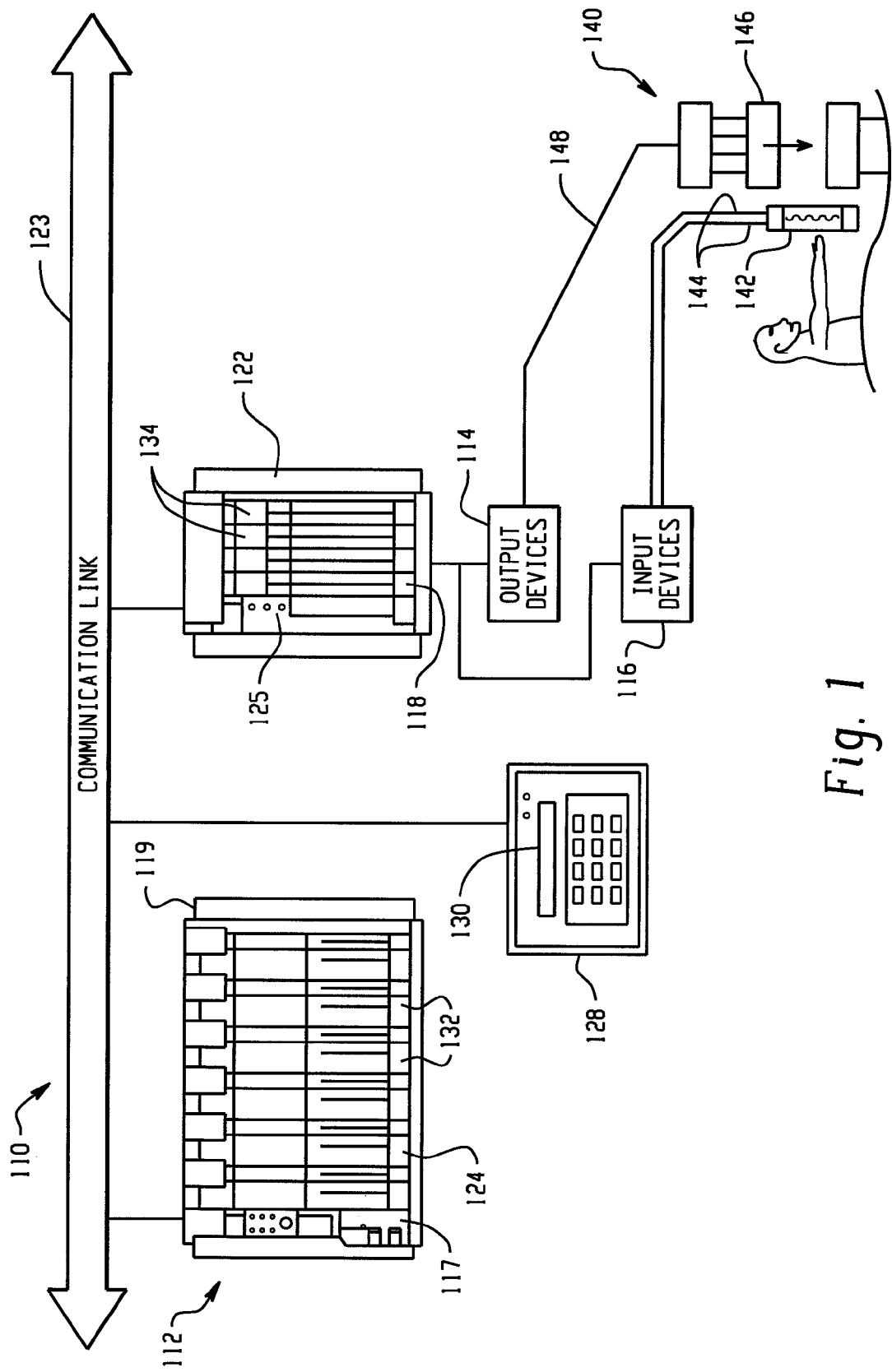
FIG. 1 is a block diagram of an industrial automation control system according to an exemplary embodiment of this disclosure.

Referring now to FIG. 1, an industrial control system 110 is illustrated. The industrial control system 110 utilizes programmable input/output (I/O) circuits that are described in greater detail below. It should be noted that the industrial control system 110 is merely one example of an industrial control system that could utilize the present invention, and that other systems are also possible.

The industrial control system 110 comprises a programmable control system 112 that controls the output status of a plurality of output devices 114 based on the input status of a plurality of input devices 116. To this end, the programmable control system 112 has a microprocessor-based processor module 117 that executes a stored control program which defines the manner in which the output devices 114 are controlled.

The processor module 117 communicates with the I/O devices 114 and 116 by way of an I/O module 118. In particular, the processor module 117 transmits a digital representation of the desired output status of the output devices 114 to the I/O module 118. Based on the digital representation of the desired output status of the output devices 114, the I/O module 118 produces an output control signal that is capable of driving the output devices 114 in the desired manner. Likewise, the processor module 117 receives a digital representation of the input status of the input devices 116 from the I/O module 118. The I/O module 118 produces the digital representation of the input status of the input devices 116 based on input status signals received from the input devices 116.

In the illustrated embodiment, the processor module 117 is disposed in a rack 119 and the I/O module 118 is disposed in a separate rack 122, and communication between the processor module 117 and the I/O module 118 occurs by way of a Remote I/O network or other communication link 123. To this end, the industrial control system 110 further comprises a communication module 124 and a communication module 125. The communication module 124 is mounted in the same rack 119 as the processor module 117 and communication between the two modules occurs by way of a common backplane that is incorporated into the rack 119. Likewise, the communication module 125 is mounted in the same rack as the I/O module 118 and communication between the two occurs by way of a common backplane that is incorporated into the rack 122. Alternatively, processor module 117 may communicate directly to communication module 125 if processor module 117 includes inherent communication port supporting communication link. Thus, information is transmitted from the processor module 117 to the I/O module 118 through the backplane of the rack 119, through the communication module 124, through the communication link 123, through the communication module 125, and through the backplane of the rack 122. Information is transmitted from the I/O module 118 to the processor module 117 by way of the opposite path.

It is to be understood that communication modules 124 and 125 may be, but are not limited to, a scanner module, adapter module, Ethernet adapter, Ethernet port, etc.

The industrial control system 110 also comprises other features such as an operator interface 128 and a message display 130. The operator interface 128 and message display 130 facilitate human interaction with the industrial control system 110. Additionally, the rack 119 contains a plurality of other modules 132. The other modules 132 could include, for example, one or more Ethernet modules, Data Highway or Data Highway Plus modules, and/or a plurality of other types of modules, all of which plug into the same common backplane. Finally, the I/O rack 122 contains a plurality of additional I/O modules 134.

Of course, numerous other arrangements are possible. For example, the I/O module 118 could be disposed in the same rack 119 as the processor module 117. Also, an industrial control system could be implemented without using rack-mounted modules.

The I/O module 118 transmits the analog output control signals to the output devices 114 and receives the analog input status signals from the input devices 116. To this end, the I/O module 118 includes digital-to-analog (D/A) converters (not illustrated) that convert digital representations of desired output status received from the processor module 117 by way of the communication link 123 to signals that are used as inputs to I/O circuits. The I/O circuits use these inputs to produce analog output control signals to control the output devices 114. Similarly, I/O module 118 also includes analog-to-digital A/D converters (not illustrated) that convert outputs of I/O circuits into digital representations of the input status that can be transmitted by way of the communication link 123 to the processor module 117. The outputs of the I/O circuits are produced based upon the analog input status signals received from the input devices 116.

In a present example, a controlled safety process 140 includes a light curtain 142 providing redundant light curtain signals 144 to the I/O module 118 and a press 146 that may be stopped via a halt signal 148 sent to the press 146 from the I/O module 118. The safety process 140 is designed to stop the press 146 if the plane of the light curtain 142 is crossed. The speed of response, i.e., the safety reaction time, of the I/O module 118 in halting the press 146 after an object cross the plane of the light curtain 142 is factored into the calculation to determine the required amount of separation between the light curtain 142 and the press 146.

Figure 2:
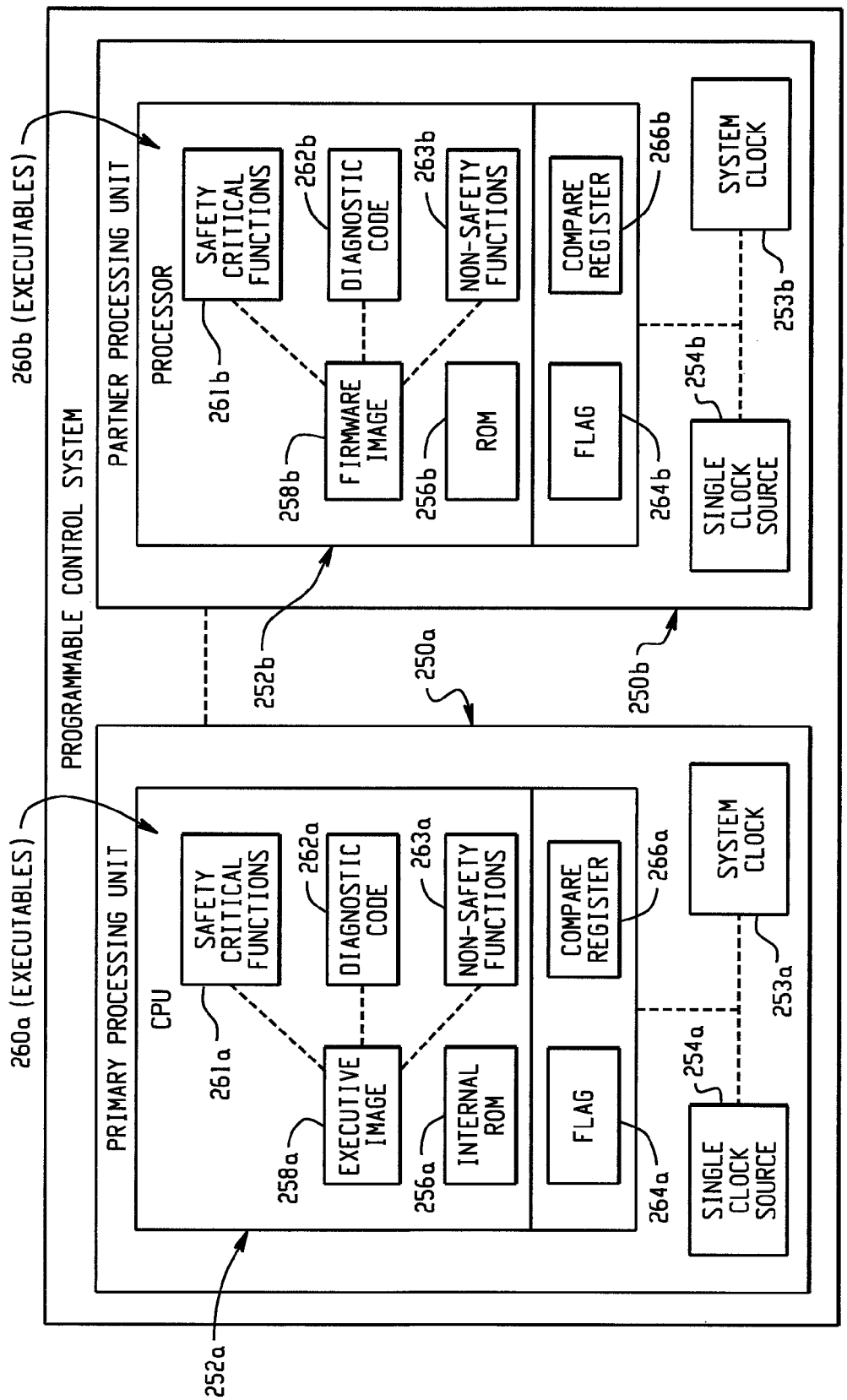
FIG. 2 is a block diagram of an industrial automation controller according to an exemplary embodiment of this disclosure.

Referring now to FIG. 2, processor module 117 includes a primary processing unit 250$a$ communicating via a communication protocol to a partner processing unit 250$b$, which can include serial or parallel communications. Primary processing unit 250$a$ includes a first, or controlling processor, or CPU, 252$a$ and a system clock 253$a$, both of which are driven by a single clock source 254$a$. The system clock 253$a$, in a preferred embodiment, increments in one microsecond intervals. The CPU 252$a$ has an internal ROM 256$a$ (read only memory) which holds an executive, or firmware, image 258$a$ of executables 260$a$ comprised of safety critical functions 261$a$, diagnostic code 262$a$, and non-safety functions 263$a$. Alternatively, internal ROM 256$a$ may be external to CPU 252$a$ and operatively associated with CPU 252$a$. CPU 252$a$ further includes a flag 264$a$ and a timer interrupt function implemented with a compare register 266$a$ wherein the compare register 266$a$ is loaded with a preset time value. When the system clock 253$a$ reaches the value stored in the compare register 266$a$, CPU 252$a$ will interrupt the execution of the executive image 258$a$. Partner processing unit 250$b$ includes mostly the same, though independent, components including a processor 252$b$ and system clock 253$b$ driven by a single clock source 254$b$, ROM 256$b$, firmware image 258$b$ of slightly different executables 260$b$ comprised of safety critical functions 261$b$, diagnostic code 262$b$ and non-safety functions 263$b$, flag 264$b$ and compare register 266$b$ providing the same timer interrupt functionality.

Figure 3:
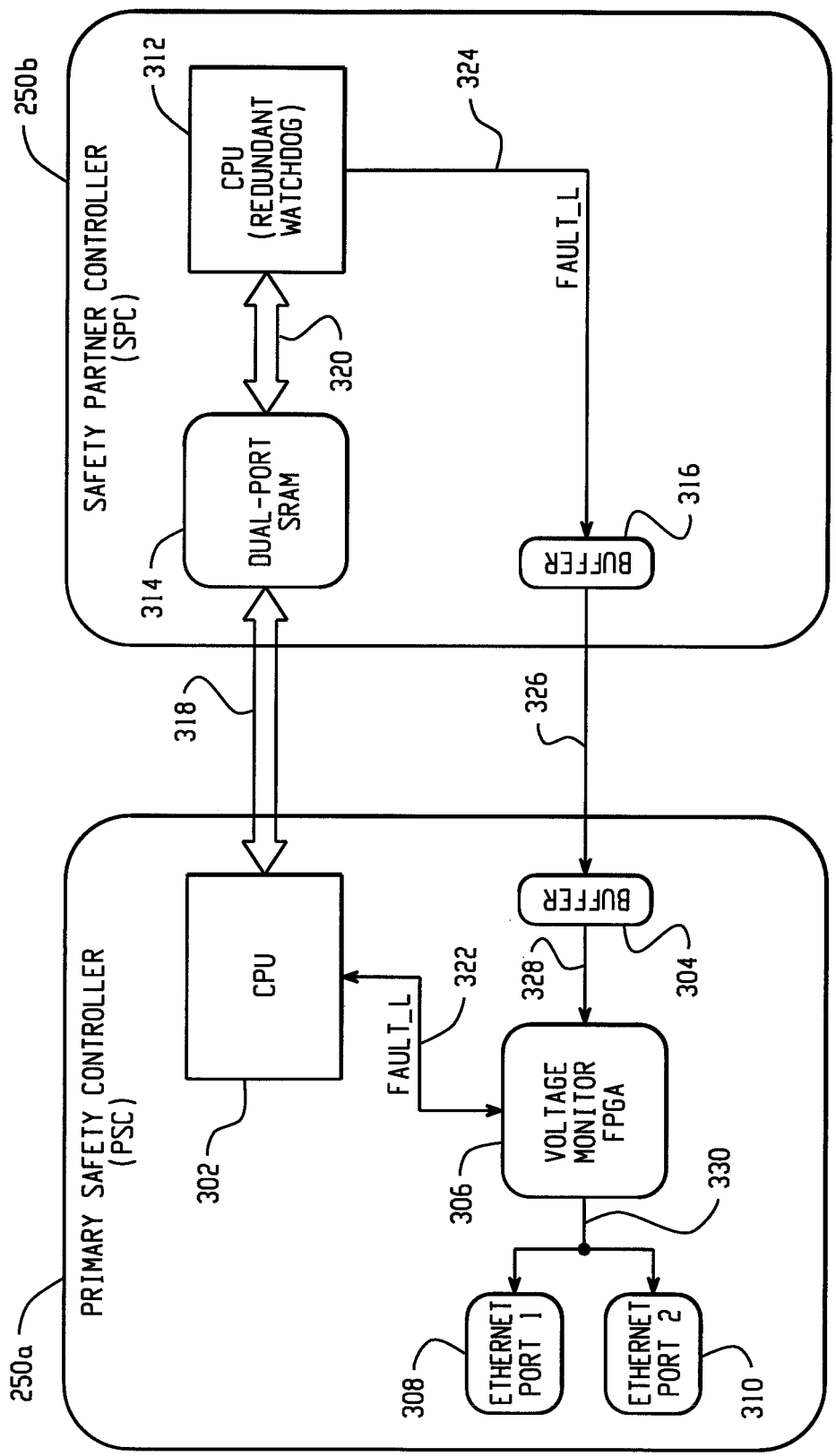
FIG. 3 is a block diagram of an industrial controller including watchdog interface circuitry according to an exemplary embodiment of this disclosure.

FIG. 3 is a block diagram of an industrial controller including watchdog interface circuitry according to an exemplary embodiment of this disclosure.

As shown, primary processing unit 250$a$, associated with a Primary Safety Controller (PSC), includes a CPU 302 operatively associated with a fault signal line 322, the fault signal line 322 operatively associated with an integrated logic circuit configured as a voltage monitor, such as a FPGA, and configured to disable external I/O communications, i.e., communication link such as Ethernet port 1 308 and Ethernet port 2 310, in the event a fault is detected by CPU 302 during the execution of a safety task scan, loop, or other routine which determines a fault condition with one or more processes. Primary processing unit 250$a$ also includes buffer 304 and communication channel 318 which are integrated with secondary processing unit 250$b$.

Secondary processing unit 250$b$, associated with a Safety Partner Controller (SPC), includes a CPU 312 (redundant watchdog) operatively associated with a fault signal line 324, a Dual-Port SRAM 314, and communication channel 320 operatively associated with data communications between Dual-Port SRAM 314 and CPU 312. Dual-Port SRAM 314 is operatively connected to CPU 302 of the primary processing unit 250$a$ via communication channel 318, the Dual-Port SRAM providing the necessary data communication and storage between the first processing unit 250$a$ and secondary processing unit 250$b$ to execute independent safety task scans/loops, and also perform watchdog functions configured to monitor the health, i.e., operational state, of the other CPU.

It is to be understood that Dual-Port SRAM 314 may be any communication medium, and/or interface, such as but not limited to, backplane, buffer, etc.

According to an exemplary embodiment of this disclosure, during the execution of a safety task scan by CPU 302 and 314, a safety I/O message is constructed by CPU 302, wrapped with a CST and passed to the second CPU 312, via Dual-Port SRAM 314, for validation by the second CPU 312. In the event the second CPU 312 determines the CST is outside an expected range or another routine determines a fault condition with one or more processes, CPU 312 generates a fault via fault line 324 which directly disables communications link, i.e., Ethernet port 1 308 and Ethernet port 2 310, with any externally controlled devices, such as I/O modules which control and monitor a safety process. The direct control of I/O communications by CPU 312 is provided by watchdog communication channel including buffer 316, interface 326, buffer 304, integrated logic circuitry 306 and controls, e.g., reset, power, etc., provided by communication channel 330.

Watchdog communication channel includes indications of CPU 312 status, e.g., reset status, fault, providing redundant communication channels between PSC CPU 302 and SPC CPU 312. In the event of primary CPUs cross communication through communication medium or interface 314 is corrupted, redundant watchdog communication channel provides status information of CPU 312 to disable safety communication link through communication port 308, 310. Watchdog communication channel 326 could utilize parallel or serial communication protocol, e.g., SPI (Serial Peripheral Interface), SCI (Serial Communications Interface), UART (Universal Asynchronous Receiver/Transmitter), etc., while integrated logic circuitry 306 performs relevant decoding/deciphering to extract indications, e.g., fault and reset. Upon affirmation of SPC fault, integrated logic circuitry 306 shutdowns/disables the communication ports 308, 310.

Figure 4:
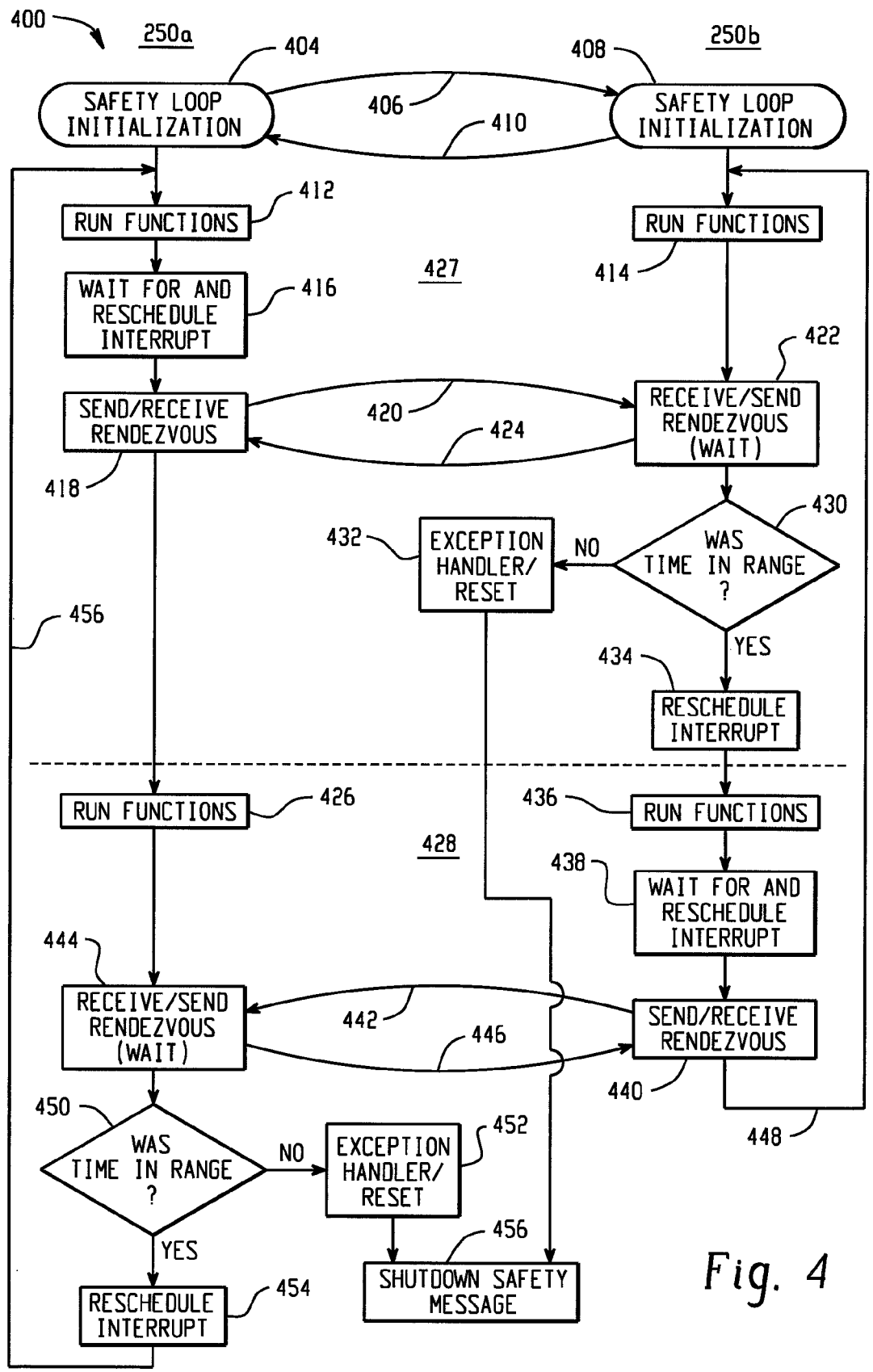
FIG. 4 is a flowchart of a safety timer cross-check algorithm executed in a dual CPU safety device according to an exemplary embodiment of this disclosure.

FIG. 4 is a visual representation of a process wherein processor Module 117 performs a safety timer cross-check diagnostic 400 beginning at start blocks 404, 408 representing a "safety loop" initialization process, according to an exemplary embodiment of this disclosure. The safety loop initialization process serves two functions; it ensures that both CPUs 252a, 252b have interrupts loaded prior to entry of the safety loop and it also synchs up the two CPUs 252a, 252b to begin the safety loop at the same time. This synching is shown by a rendezvous message 406 and an acknowledgement message 410 between the two processing units 250a, 250b.

As previously mentioned, timer compare registers 266a, 266b are used to generate the interrupts in CPUs 252a, 252b. In a preferred embodiment, the first interrupt is scheduled in CPU 252a, acting as controlling CPU, by loading compare register 266a with a value representing the 6 ms from when the previous interrupt was scheduled to occur. The 6 ms time period represents the rated safety reaction time of the I/O module 118. An interrupt is also scheduled in CPU 252b, acting as monitoring CPU, to occur at a time slightly longer than the 6 ms time loaded into CPU 252a. The extra time, e.g., 0.1 ms, acts as a cushion or tolerance and is necessary due to the slight delay between CPU 252a being interrupted and processing unit 250a sending a rendezvous message to processing unit 250b as well as to allow for slight time differences between the processing units 250a, 250b.

After the interrupts have been scheduled, i.e., after the timer compare registers 266a, 266b have been loaded, processing units 250a, 250b have essentially begun executing a first safety loop 427. As previously discussed, in the first safety loop 427, while running the diagnostic 400, processing unit 250a acts as the controlling unit while partner processing unit 250b acts as the monitoring unit. As shown in blocks 412 and 414, CPUs 252a, 252b in each processing unit 250a, 250b process the executables 260a, 260b, including safety critical functions 261a, 261b and non-safety functions 263a, 263b. After completing the safety functions 261a which in this example this typically occurs after 4 ms have elapsed, an internal flag 264a is set. This flag indicates that the safety critical functions 261a, have been completed by the controlling CPU 252a within the rated safety reaction time. Thereafter, CPU 252a executes non-safety functions 263a while waiting for the timer interrupt, shown as block 416. Meanwhile, CPU 252b finishes executing safety critical functions 261b, sets flag 264b and begins executing non-safety functions 263b while waiting for either rendezvous message 420 from processing unit 250a or for its own timer interrupt, shown as block 422.

When the system clock 253a matches the scheduled interrupt time loaded in the timer compare register 266a, i.e., after 6 ms have elapsed based on the input from clock source 254a, CPU 252a interrupts the processing of the executive image 258a. Alternatively, instead of loading the timer compare register 266a to interrupt after the safety reaction time has elapsed, CPU 252a could repeatedly poll a timer or counter to determine when the time has elapsed. However, this is not the preferred approach as it offers no watchdog function to protect against the case where CPU 252a encounters unexpected delays.

After the interrupt occurs, CPU 252a immediately schedules a new interrupt to occur after another 6 ms plus the cushion have elapsed. The cushion is included because CPU 252a becomes the monitoring unit during the next safety loop 428. The interrupt is scheduled by loading the compare register 266a with a value representing the next desired interrupt time and is scheduled immediately after the previous interrupt to ensure that processing system 250a is always protected against any unexpected delays. CPU 252a next checks whether or not flag 264a is set. If flag 264a is not set, i.e., all the safety critical functions 261a were not completed, a hard or critical fault occurs. Processing unit 250a goes into a safe state and then resets. If the flag 264a is set, a rendezvous signal 420 is sent to processing unit 250b from block 418 to indicate that the time value loaded into compare register 266a, i.e., the safety reaction time of 6 ms, has elapsed as perceived by processing unit 250a.

In block 422, processing unit 250b receives the rendezvous signal 420 and promptly replies with an acknowledgement signal 424. In the event of an unexpected delay or inaccurate clock such that CPU 252b is interrupted before receiving rendezvous signal 420, a critical fault will occur wherein the processing unit 250b will go into a safe state and then reset. Otherwise, after receiving rendezvous message 420, CPU 252b checks whether or not flag 264b is set, indicating that all safety functions 261b have been completed. If flag 264b is not set, a critical fault will also occur. If flag 264b is set, processing unit 250b determines whether or not the elapsed safety reaction time, as determined by CPU 252a using clock source 254a, is within the allowable range or cushion (decision block 430). In essence, processing unit 250b is checking the accuracy of clock source 254a by comparing what processing unit 250a determined 6 ms to be against what processing unit 250b, using clock source 254b, determined 6 ms (plus the cushion) to be.

If the safety reaction time of processing unit 250a is not within an acceptable range, the processing unit 250b will fault, shown as block 432 and generate a shutdown safety message 456. If the safety reaction time of processing unit 250a is within the acceptable range, processing unit 250b moves to block 434 and schedules the next interrupt. Since CPU 252b will act as the controlling CPU in the next safety loop 428, the value loaded into timer compare register 266b is the value of 6 ms from the current time.

At this point, the roles of the primary processing unit 250a and partner processing unit 250b are reversed wherein the primary processing unit 250a becomes the monitoring processing unit while partner processing unit 250b becomes the controlling processing unit. This symmetry, i.e., role-swapping, is useful because at this point in the diagnostic 400, only the clock source 254a of primary processing unit 250a has been verified as being accurate. By swapping roles, the diagnostic 400 ensures that both CPUs 252a, 252b have the ability to accurately measure time as well as the ability to interrupt to generate a fault.

As shown in blocks 426 and 436, CPUs 252a, 252b of each processing unit 250a, 250b process the executables 260a, 260b, including safety critical functions 261a, 261b again. After completing the safety functions 261a, 261b, internal flags 264a, 264b are set. Thereafter, CPU 252b waits for its timer interrupt shown as block 438 while CPU 252a waits for either rendezvous message 442 from processing unit 250b or for its own timer interrupt.

When the system clock 253b matches the scheduled interrupt time value loaded in timer compare register 266b, i.e., after 6 ms have elapsed based on the input from clock source 254b, CPU 252b interrupts processing. After the interrupt, the CPU 252b immediately schedules a new interrupt (with cushion) to prepare for monitoring, as previously discussed. Next, CPU 252b checks whether or not the flag 264b is set. If flag 264b is not set, a critical fault occurs in processing unit 250b which goes to a safe state and then resets. If the flag 264b is set (block 440), a rendezvous signal 442 is sent to processing unit 250a to indicate that the time loaded into compare register 266b, i.e., the safety reaction time of 6 ms, has elapsed as determined by processing unit 250b using clock source 254b. Processing unit 250a meanwhile receives signal 442 (block 444) and promptly replies with acknowledgement signal 446. Processing unit 250b enters a new safety loop and begins processing safety functions 261a (shown as return path 448 to safety loop 427).

In the event that CPU 252a is interrupted before receiving rendezvous signal 442, (as a result of an unexpected delay or inaccurate clock), a critical fault occurs wherein the processing unit 250a will go to a safe state and then reset. After receiving rendezvous signal 442, CPU 252a checks whether or not flag 264a is set. If flag 264a is not set, a critical fault would also occur. If flag 264a is set, processing unit 250a (decision block 450) determines whether or not the elapsed safety reaction time, as calculated by CPU 252b using clock source 254b, is within the allowable range or cushion.

If the safety reaction time, as determined using clock source 254a, is not within the acceptable range, the processing unit 250a will fault, shown as block 452 and generate a shutdown safety message 456. If the safety reaction time is within the acceptable range, processing 250a unit moves to block 454 where the next interrupt is scheduled. Since 252a will be the controlling CPU again, the value loaded into timer compare register 266a would be 6 ms from the time the last interrupt was scheduled by CPU 252a, in block 416 (ensuring that the combined time of safety loops 427 and 428 is exactly two safety reaction times, i.e., 12 ms). Processing unit 250a then enters a new safety loop and begins processing safety functions 261a (shown as return path 454 to safety loop 427).

The safety timer cross-check diagnostic 400 can be repeated at a predetermined frequency while CPUs 252a, 252b of processing units 250a, 250b continue to perform the executables 260a, 260b, within the safety loops.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

This description uses examples to disclose the invention and also to enable any person skilled in the art to practice the invention, including making and using devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The following is claimed:

1. An industrial automation controller comprising:
   a first processing unit including a first processor, a first memory, a first clock source, and a first fault indicator signal, the first processing unit configured to execute a first safety loop;
   a second processing unit including a second processor, a second memory, a second clock source, and a second fault indicator signal, the second processing unit configured to execute a second safety loop;
   a communication link configured to provide status information between the first processing unit and the second processing unit;
   a communications device operatively associated with I/O (Input/Output) communications between the first processing unit and one or more remote devices; and
   an interface circuit operatively associated with the first processing unit, the second processing unit and the communications device, the interface circuit configured to receive as inputs the first fault indicator signal and the second fault indicator signal, provide data communications between the first processor and the communications device, and disable the I/O communications between the first processing unit and the one or more remote devices if the first fault indicator signal and/or the second fault indicator signal represents a fault condition associated with an execution of the first safety loop and/or the second safety loop.

2. The industrial automation controller according to claim 1, the first and second safety loops comprising:
   a synchronization routine executed by both the first and second processing units to synchronize the start of the execution of the first and second safety loops; and
   a diagnostic routine executed by both the first and second processing units.

3. The industrial automation controller according to claim 2, wherein the diagnostic routine executed by the second processing unit determines if a CST (Coordinate System Time) associated with the first processing unit is within an acceptable range.

4. The industrial automation controller according to claim 2, wherein the diagnostic routine executed by the first processing unit determines if a CST associated with the second processing unit is within an acceptable range.

5. The industrial automation controller according to claim 1, comprising:
   a safety task scan routine executed by the first processing unit, the safety task scan generating a safety I/O message which is wrapped with a CST and passed to the second processing unit for validation by the second processing unit.

6. The industrial automation controller according to claim 1, wherein the interface circuit is a FPGA (Field Programmable Gate Array).

7. The industrial automation controller according to claim 1, wherein the communications device is an Ethernet device.

8. A method of operating an industrial automation controller including a first processing unit, a second processing unit, and a communications device operatively associated with I/O (input/output) communications between the first processing unit and one or more remote devices, the first processing unit including a first processor, a first memory, a first clock source and a first fault indicator signal, the second processing unit including a second processor, a second memory, a second clock source and a second fault indicator signal, the first and second memory loadable with a first and second safety program, respectively, and input/output variables, the safety programs being repeatedly executable to read input variables representing inputs from one or more remote devices and write output variable representing outputs to one or more remote devices, the method comprising:
   a) synchronizing the first and second processors;
   b) loading the first and second processors with first and second predetermined interrupt times, respectively;
   c) executing at least one loop of both safety programs, the first processing unit generating a safety I/O message which is wrapped with a CST (Coordinate System Time) based on the first clock source and passed to the second processing unit for validation by the second processing unit;
   d) if the CST is not within predetermined range of values, the second processing unit generating the second fault indicator signal which is associated with disabling communications to the one or more remote devices; and
   e) interrupting the first processor after the first interrupt time has elapsed as perceived by the first processor;
   wherein the industrial automation controller includes an interface circuit operatively connected to the first processing unit, the second processing unit and the communication device and the interface circuit performs step d) to disable communications to the one or more remote devices.

9. The method of operating an industrial automation controller according to claim 8, further comprising:
   f) re-synchronizing the first and second processor;
   g) reloading the first and second processors with predetermined interrupt times;
   h) executing at least one loop of both safety programs;
   i) interrupting the second processor after the second interrupt time has elapsed as perceived by the second processor and sending a signal to the first processing unit; and
   j) the first processing unit determining if the second interrupt time, as measured by the first processing unit, substantially equals the time for the second interrupt as measured by the second processing unit.

10. The method of operating an industrial automation controller according to claim 9, further comprising:
    k) repeatedly executing safety loops while monitoring the clock sources of each processing unit; and
    l) entering a safe state if either clock source is determined to be inaccurate.

11. The method of operating an industrial controller according to claim 8, wherein the interface circuit is a FPGA (Field Programmable Gate Array).

12. A controller module comprising:
    a first processing unit including a first processor driven by a first clock source;
    a second processing unit including a second processor independent from the first processor driven by a second clock source independent from the first clock source wherein the second processor is synchronized with the first processor;
an interface circuit operatively connected to the first processing unit and the second processing unit; and
a diagnostic module operatively associated with the first processing units; wherein the diagnostic module validates the accuracy of each clock source, the second processing unit validates a CST (coordinate system time) time associated with a safety I/O message provided by the first processing unit, the diagnostic module initially assigns the first processor to be a controlling processor and the second processor to be a monitoring processer to be interrupted after the controlling processor is interrupted, and the interface circuit disables communications to one or more associated remote devices if the CST time is not within a predetermined range of values.

13. The controller module of claim 12, wherein after the controlling processor is interrupted, the controlling processor sends a signal to the monitoring processor.

14. The controller module of claim 13, wherein the monitoring processor verifies the accuracy of the clock source of the controlling processor.

15. The controller module of claim 14, wherein the module enters a safety state if the monitoring processor determines that the accuracy of the clock source of the controlling processor is not within a preset range.

16. The controller module of claim 15, wherein the first and second processors switch roles and one loop of each safety program is re-executed.

17. The controller module according to claim 16, wherein the interface circuit is a FPGA (Field Programmable Gate Array).

* * * * *